United States Patent
Hansen (10) Patent No.: US 7,513,558 B2
(45) Date of Patent: Apr. 7, 2009

(54) SAFETY SEAT, SUSPENDED IN A LAND VEHICLE, AIRCRAFT OR VESSEL

(75) Inventor: Holger Hansen, Hambürg (DE)

(73) Assignee: Autoflug GmbH (DE)

( * ) Notice: Subject to any disclaimer, the term of this patent is extended or adjusted under 35 U.S.C. 154(b) by 541 days.

(21) Appl. No.: 10/571,045

(22) PCT Filed: Aug. 7, 2004

(86) PCT No.: PCT/EP2004/008885

§ 371 (c)(1),
(2), (4) Date: Apr. 4, 2006

(87) PCT Pub. No.: WO2005/028245

PCT Pub. Date: Mar. 31, 2005

(65) Prior Publication Data

US 2008/0246317 A1     Oct. 9, 2008

(30) Foreign Application Priority Data

Sep. 5, 2003   (DE) ................ 103 41 483

(51) Int. Cl.
*B60N 2/04*   (2006.01)
(52) U.S. Cl. ............... 296/68.1; 296/65.02; 296/65.01; 297/468; 297/452.63; 244/122 R
(58) Field of Classification Search ........... 296/65.01, 296/68.1, 65.02, 63; 297/216.1, 468, 469, 297/464, 475, 476, 477, 478, 479, 452.63, 297/452.64; 280/801.1, 807, 808; 244/122 R, 244/122 AG, 122 B, 141

See application file for complete search history.

(56) References Cited

U.S. PATENT DOCUMENTS

| 2,700,412 A | * | 1/1955 | Evans et al. ............... 297/232 |
| 2,829,702 A | * | 4/1958 | Keating ................... 297/183.9 |
| 3,314,720 A | * | 4/1967 | Millington et al. ....... 297/216.1 |
| 3,954,280 A | * | 5/1976 | Roberts et al. ........... 280/801.2 |
| 4,299,406 A | * | 11/1981 | Thomas .................... 280/733 |
| 4,474,347 A | * | 10/1984 | Mazelsky ............... 244/122 R |
| 4,563,023 A | * | 1/1986 | Clarkson .................. 280/748 |
| 4,625,335 A | | 12/1986 | Vinai |
| 4,679,840 A | * | 7/1987 | Fry et al. .................. 296/64 |

(Continued)

FOREIGN PATENT DOCUMENTS

DE           33 06 839        9/1984

(Continued)

*Primary Examiner*—Jason S Morrow
(74) *Attorney, Agent, or Firm*—Robert W. Becker; Robert W. Becker & Assoc.

(57) ABSTRACT

A safety seat for land vehicles, aircraft or vessels, comprising a harness for suspension from fixed points of a vehicle and for supporting a vehicle occupant. Belt retractors are disposed at the fixed vehicle points, and fabric supporting belts extend from the harness to the retractors, which pretension the belts in a direction of retraction. A manually operable switching device allows the belt retractors to be switched into a free running state, a blocking state, or a positioning state. The free running state permits free withdrawal of the belts in a direction opposite to the pretension. The blocking state effects a complete blocking of the belts in both the withdrawal and the retraction directions. The positioning state effects blocking of the belts in only the withdrawal direction.

18 Claims, 4 Drawing Sheets

U.S. PATENT DOCUMENTS

| | | | |
|---|---|---|---|
| 4,909,499 A | | 3/1990 | O'Brien et al. |
| 4,923,147 A | * | 5/1990 | Adams et al. ......... 244/122 AG |
| 5,046,687 A | * | 9/1991 | Herndon ............... 244/122 AG |
| 5,072,840 A | | 12/1991 | Asakawa et al. |
| 5,579,785 A | * | 12/1996 | Bell ........................... 128/875 |
| 5,642,916 A | | 7/1997 | Dybro et al. |
| 5,806,910 A | * | 9/1998 | DeRees ....................... 296/63 |
| 6,409,243 B1 | | 6/2002 | Hansen |
| 6,446,910 B1 | * | 9/2002 | Knoll et al. ............. 244/122 R |
| 6,447,012 B2 | | 9/2002 | Peter et al. |
| 6,554,343 B2 | * | 4/2003 | Sugiyama .................. 296/68.1 |
| 2008/0203805 A1 | * | 8/2008 | Hansen .................. 297/452.63 |

FOREIGN PATENT DOCUMENTS

| | | |
|---|---|---|
| DE | 43 03 719 | 8/1994 |
| DE | 101 30 631 | 1/2003 |

* cited by examiner

SAFETY SEAT, SUSPENDED IN A LAND VEHICLE, AIRCRAFT OR VESSEL

This specification for the instant application should be granted the priority date of Sep. 5, 2003, the filing date of the corresponding German patent application 103 41 483.5as well as the priority date of Aug. 7, 2004, the filing date of the corresponding International patent application PCT/EP2004/1008885.

BACKGROUND OF THE INVENTION

The invention concerns safety seats for land vehicles, aircraft or vessels (collectively "vehicles") by means of which persons that are to be transported on the seats are supported securely, especially if the vehicle is affected by accelerations. Safety seats of the aforementioned kind, particularly in their use in aviation, are described e.g. in the WO 98/47762 and in the further publications explained therein.

Safety seats of the aforementioned kind usually comprise a rigid seating surface that is attached to the corpus of the vehicle and especially to the bottom of the vehicle via corresponding reinforcement means. An associated harness usually comprises two shoulder belts and two lap belts. One end of each belt is fixedly attached to the vehicle while the other ends converge in a central belt buckle, which is located in front of the person that is to be transported.

Particularly if used in an armored land vehicle, it is of importance to protect a person sitting on the seat from the consequences of acceleration that is caused e.g. by the explosion of a landmine underneath the bottom of the vehicle. The vehicle is thereby often not only entirely lifted off the ground, but the floor of the vehicle is bent considerably inwardly. Accordingly, safety seats that are fixedly attached to the corpus of the vehicle show safety risks. They not only transfer shocks and vibrations caused by driving onto the vehicle occupant, they also do not provide enough protection against the floor bending inwardly.

As an alternative it has already been suggested to locate safety seats of the aforementioned kind suspended from the roof of the concerning vehicle. This has the disadvantage that such seats are usually very heavy and occupy a lot of space. At the same time, a substantial distance to the floor of the vehicle has to be maintained, which further increases the space necessary to install the seat.

Finally, all configurations of seats bring about the problem that these safety seats are fixed components of the vehicle which considerably reduce the mobility of the person sitting in a vehicle and particularly of the person performing certain tasks in the military field. Furthermore for the safety seat is not adjustable to the body proportions of the occupant.

A safety seatcomprising a fabric covering with an entry that encloses the occupant's body up to over the height of the head in the back and on the sides is described in detail in DE 43 03 719 A1. On the top and on the bottom, the safety seat can be suspended between the floor and the roof area of the vehicle by means of supporting belts that are attached to the covering.

Further, a seat equipped with safety belts, installed in a vehicle protected against landmines, is shown in DE 101 30 631 A1. In order to detach the seat from the floor of the vehicle, the seat is suspended via at least one supporting arm in the upper area of the side wall of the vehicle.

Likewise, the object of U.S. Pat. No. 5,642,916 is a seat installed in a vehicle. The basic configuration of the seat allows movement of the seating surface, whereby the seating surface is secured in the vehicle via supporting belts that are supported on belt retractors.

The seat described in U.S. Pat. No. 4,909,499 is provided with a belt fixture for a safe support of the vehicle occupant's head in the case of corresponding vehicle accelerations.

The DE 199 57 814 A1 finally describes a belt retractor that is propelled by an electric motor. It comprises a blocking mechanism that can be controlled by an operator and an electronic control unit that makes it possible to control different functions of the belt retractor.

It is an object of the invention to provide a safety seat that is universally applicable, that can be positioned in the vehicle in a space-saving manner, and that at the same time ensures maximum freedom of movement for the tasks that the occupant has to perform in the vehicle.

SUMMARY OF THE INVENTION

The realization of the object including advantageous embodiments and further developments of the invention proceeds from the content of the patent claims, which follow this description.

It is the fundamental concept of the invention to provide a safety seat for land vehicles, aircraft or vessels, comprising a harness that is suspended from fixed points of the vehicle and which is to be put onto the vehicle occupant's body without fixed components and which is to support the occupant. Fabric supporting belts extend from the harness to belt retractors that are located on the fixed points and pretension the connected supporting belts in the direction of retraction. Further provided is a switching device that can be operated by the occupant and by means of which the belt retractors can be switched into either a free running state with free belt withdrawal opposite to the pretension that is provided in the direction of retraction, or into a blocking state with complete blocking of the belt shaft effective both in the direction of belt retraction and in the direction of belt withdrawal, or into a positioning state in which the belt retractors are only blocked in the direction of belt withdrawal.

The invention is therefore based on the principle to solely tie the safety seat to the harness that is to be put onto the occupant's body while refraining from the use of fixed components and to suspend the harness, via supporting belts, from belt retractors that are fixedly attached to the vehicle so that the result is a sardonic suspension of the vehicle occupant with his body-related seat between the fixed points that are formed by the belt retractors. In order to ensure the stability of the seat, which is desired in certain driving situations of the vehicle or while performing certain working movements, the belt retractors are initially designed with a pretension that constantly biases the supporting belts in the direction of retraction and can further be switched into different operational states by means of a switching device that is to be operated by the vehicle occupant. A first switching state thereby enables a free running state of the belt retractors in which the supporting belts can be withdrawn from the non-oriented belt retractor and wound up again independently. The occupant that is connected to the belt retractors by means of his harness can therefore move freely between the fixed points, whereby due to the pretension in the direction of retraction of the supporting belts any uncontrolled belt length of the supporting belts is avoided. A second switching state leads to a complete blocking of the belt retractors both for belt withdrawal and belt retraction. In that switching state, the supporting belts are tautly and unyieldingly secured so that the vehicle occupant is in other words suspended between the fixed points and therefore secured without any real possibility of movement. A third switching state exclusively allows belt retraction while belt withdrawal is blocked. That realizes a kind of back stop by means of which belt length of the supporting belts that is released through movement of the vehicle occupant is retracted, yet the vehicle occupant is secured in the position he last occupied, so that a positioning state is realized.

On the one hand, the above mentioned switching device provides a maximal freedom of movement for the vehicle occupant, while on the other hand a safe support and securing of the vehicle occupant in optional positions within the vehicle is ensured, which is to be described in more detail with the aid of the stress profiles in an armored vehicle.

According to one embodiment of the invention, the harness to comprises a belt sling that supports the buttocks of the occupant with two longitudinal belts extending along the upper body, at least one back belt that connects the two longitudinal belts behind the occupant's back, two shoulder belts that start at the longitudinal belts and extend over the occupant's shoulders, and two lap belts which are connected to the longitudinal belts. The free ends of the shoulder belts and the lap belts can be buckled together in a central belt buckle.

In one further embodiment, the longitudinal belts of the harness can be extended and, as supporting belts, can each run to a belt retractorthat is located above the vehicle occupant. Two further supporting belts can be connected to the belt sling in the vehicle occupant's hip area and each extend to a belt retractor that is located in front of the seat and facing the vehicle occupant. The harness that supports the vehicle occupant is therefore suspended from at least four belt retractors that are located at a certain distance from each other.

In a further embodiment, the invention is focused on providing a so called memory function with regard to the possible seating positions of the vehicle occupant. Under certain operational circumstances of a vehicle it is desirable that the vehicle occupant, primarily located in an uppermost position, is on the one hand able to rapidly occupy preferably the lowest position in the vehicle, but is on the other hand able to immediately and as rapidly occupy a pre-defined working position in the vehicle.

According to one embodiment of the invention it is therefore intended that each supporting belt that extends to a belt retractor runs through and is supported on the harness in a looped manner and, from the harness, extends to a further belt retractor. Both ends of each supporting belt, which are located on both sides of its loop-like connection to the harness, are therefore each connected to a belt retractor. The additional belt retractors are linked to an additional switching device comprising the functions free-running state, blocking state and positioning state. The second, additional switching device thereby serves as a memory function and has the purpose to ensure, in conjunction with the four additional belt retractors that are controlled by it, that the vehicle occupant can quickly reassume a pre-defined seating position. In that context, the length of the supporting belts can be dimensioned in such a way that, if the belts are completely withdrawn from the belt retractors, the safety seat is located in the lowest position.

According to one embodiment of the invention, the above mentioned memory function can be realized by way of an appropriate configuration of each one of the existing belt retractors, so that no larger quantity of belt retractors is necessary. If the belt retractors that are utilized in any case are to be employable for that memory function, each of the supporting belts can run through and be supported on the harness in a looped manner and that both ends of each supporting belt, located on both sides of its loop-like connection to the harness, are connected to the associated belt retractors. Switching devices comprising the functions free running state, blocking state and positioning state that are to be operated separately are assigned to each belt retractor and each one of the switching devices controls the state of movement of one end of the two supporting belt ends that are connected to the associated belt retractor.

Regarding the securing of the occupant who is wearing the harness to the belt retractors, according to one embodiment of the invention a supporting belt that extends to a belt retractor located in the floor area of the vehicle is connected to the belt sling that supports the buttocks of the vehicle occupant. In addition, a supporting belt, which extends to a belt retractor that is attached to the vehicle in the back area of the occupant, can be connected to the back belt of the harness.

An improved fit of the harness on the body of the occupant can be realized if, according to one embodiment of the invention, two back belts are connected to the longitudinal belts of the harness, one in the shoulder area and one in the hip area, and if the supporting belt is connected to the back belt that is located in the shoulder area.

According to embodiments of the invention, the belt sling including the adjacent sections of the longitudinal belts and the back belt that is located in the hip area can be connected with each other via a fabric seating surface and/or the longitudinal belts and the back belts can be connected by way of a fabric backrest.

As far as it is intended, according to one embodiment of the invention, that the supporting belts are releasably attached to the associated belt sections of the harness, that brings with it the advantage that the vehicle occupant's freedom of movement especially when entering the vehicle is improved, since the vehicle occupant can put on the harness before entering the vehicle and attach it to the associated supporting belts after entering.

The fact that the supporting belts are releasable from the harness on the occupant's body further provides the possibility to integrate and connect these areas of the harness with the clothing that the occupant is to wear. If the occupants often wear overalls made out of robust material, the corresponding belts can be embedded into those overalls so that the supporting belts are directly connectable to the overalls.

Regarding the configuration and control of the belt retractors, according to one embodiment of the invention a switching box with a switching lever, which is movable between three positions, is attached to the vehicle so as to be reachable by the occupant, and control lines lead from the switching box to each one of the installed belt retractors.

The pretension on the belt retractors that is effective in the direction of belt retraction can in particular be induced by spring tension, or alternatively the pretension on the belt retractors that is effective in the direction of belt retraction can be generated by engaging an active drive mechanism for the belt shaft.

Finally, in the positioning state, the blocking of the belt retractor in the direction of belt withdrawal can be realized by a ratchet mechanism.

BRIEF DESCRIPTION OF THE DRAWINGS

Described below are embodiments that are represented in the drawings, in which:

FIG. 2a-2c show a different embodiment of the invention comprising a memory function for an operating position that can be adjusted by means of the additional switching device, whereby

DESCRIPTION OF SPECIFIC EMBODIMENTS

Figure 1:
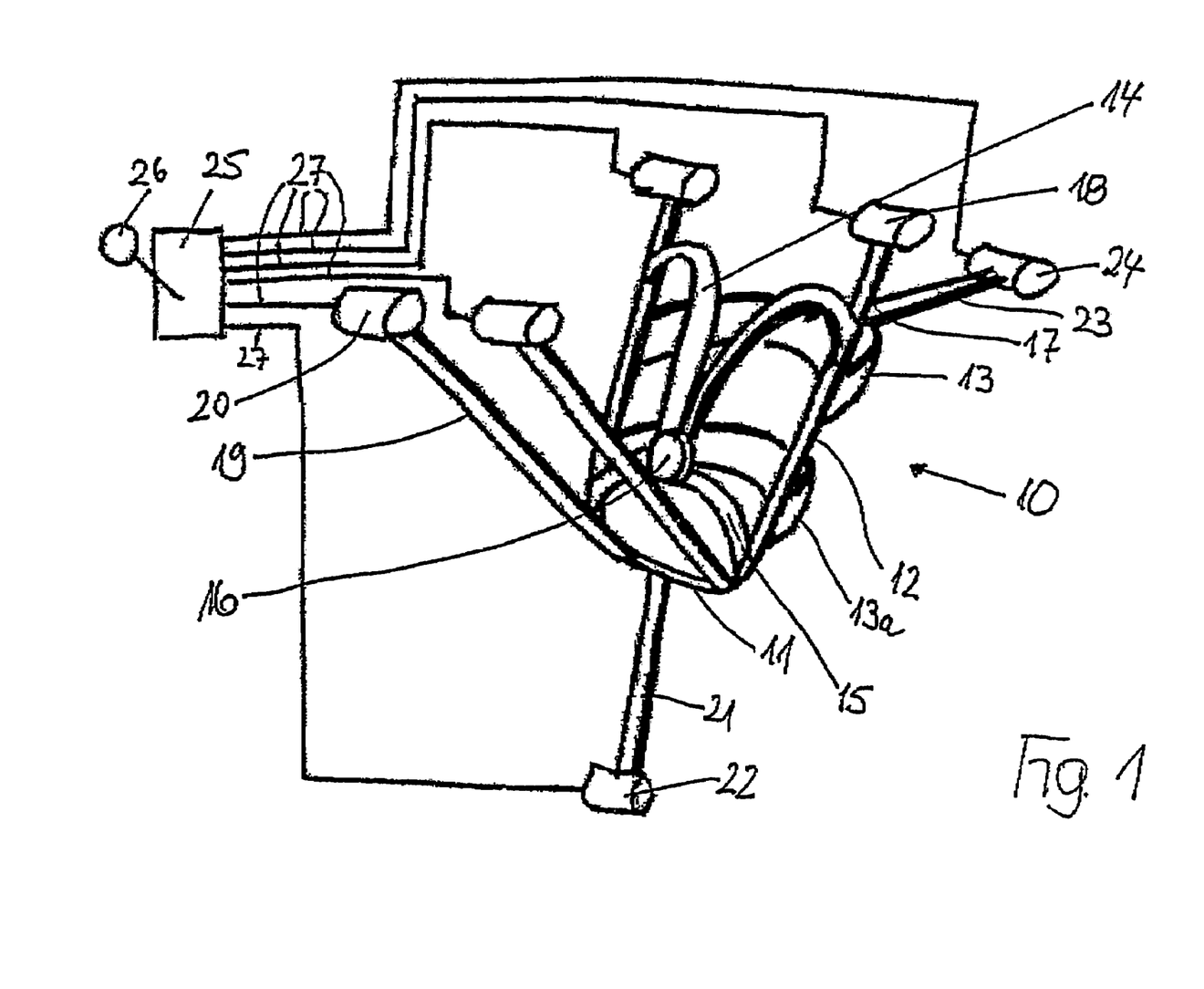
FIG. 1 shows a schematic representation of a harness, connected to associated belt retractors via supporting belts, including the switching device associated with the belt retractors.

The harness 10 that is represented in the drawing primarily comprises a belt sling 11 that supports the buttocks of the not represented occupant. The belt sling 11 has two longitudinal belts 12 extending upwardly along the upper body, whereby in the embodiment represented here the longitudinal belts 12 are connected by two back belts 13 and 13a serving as back support for the occupant. The one back belt 13 is located in the shoulder area, the other back belt 13a is located in the hip area. Two shoulder belts 14, starting at the longitudinal belts 12 and extending over the occupant's shoulder, and two lap belts 15, which are connected to the longitudinal belts 12, make the harness 10 complete. The free ends of the shoulder belts 14 and of the lap belts 15 can be buckled together in a central belt buckle 16. It is intended but not further represented for the aforementioned components of the harness 10 to each be adjustable in their length so as to be adaptable to the body proportions of a vehicle occupant.

The harness 10 described above is to be connected to belt retractors, which are fixedly attached to the vehicle, via supporting belts that are described below. In that way, the harness 10 is suspended between the fixed points that are formed by the corresponding belt retractors.

In the embodiment represented here, the longitudinal belts 12 of the harness 10, in an elongation as supporting belts 17, each extend to a belt retractor 18 that is located above the vehicle occupant. Two further supporting belts 19 are attached to the belts sling 11 in the vehicle occupant's hip area and each extend to a belt retractor 20, located in front of the seat and facing the vehicle occupant. The components of the harness 10 that support the weight of the vehicle occupant, that is to say the belt sling 11 and respectively the lap belts 15 and the longitudinal belts 12, are suspended from at least four belt retractors 18, 20 that are located a certain distance from each other.

In order to further stabilize the harness 10 that forms the safety seat, an additional supporting belt 21 extends from the belt sling 11, which supports the vehicle occupant's buttocks, to a belt retractor 22 that is located in the floor area of the vehicle. Another supporting belt 23 extends from the back belt 13 that is located in the shoulder area to a belt retractor 24, which is attached to the vehicle in the area behind the occupant's back.

In front of the vehicle occupant, a switching box 25 with a switching lever 26 is attached to the vehicle so as to be reachable by the occupant. The switching lever 26 is movable between three positions. A control line 27 extends from the switching box 25 to each of the installed belt retractors 18, 20, 22, 24. For a better comprehension of the following operating description, the switching positions that can be realized in the switching box 25 are characterized as follows:

Position I: free running state with free belt withdrawal and free belt retraction (free running state);

Position II: complete blocking of all belt retractors both for belt withdrawal and belt retraction (blocking state);

Position III: blocking of the belt retractors for belt withdrawal while free belt retraction is enabled (positioning state)

When the vehicle occupant either puts on the harness 10, which is located in the vehicle, after entering the vehicle or enters the vehicle with the harness 10 already put onto his body outside the vehicle for the harness 10 to be connected to the supporting belts 17, 19, 21, 23, the switching lever 26 is situated in the position I. Likewise, the switching lever remains in the position I in those cases in which an unconfined mobility of the vehicle occupant is desired, e.g. for loading or operation of weapon systems. The switching position I further enables the vehicle occupant to place himself into the desired seating the position inside the vehicle. That applies for example to the driver of an armored vehicle in his operating or driving position with his head or upper body protruding through the hatch of the vehicle. After reaching the position, the switching lever 26 is switched into the position II in which the belt retractors are blocked both for further belt withdrawal and further belt retraction. The result is a secure fixation of the vehicle occupant, who is wearing the harness 10, between the belt retractors. In that switching position, the harness 10 functions as a stable safety seat.

If e.g. the driver faces a dangerous situation in which he rapidly has to correct or change his seating position in order to withdraw his upper body or head from the area of the hatch, the switching lever 26 is moved into the switching position I. In that switching position, the supporting belts 17, 19, 21, 23 are released so that the occupant instantly falls into a lower seating position. If the switching lever 26 is situated in the switching position III, the occupant can approach the desired seating position. The belt retractors 18, 20, 22, 24 thereby retract as much belt length of the supporting belts as is released by the body movements, but, in the manner of a back stop, they do not release any belt. During the movement of the vehicle occupant in the switching position III of the switching lever 26, the occupant is hence protected form intense accelerations of the vehicle at all times.

Figure 2A:
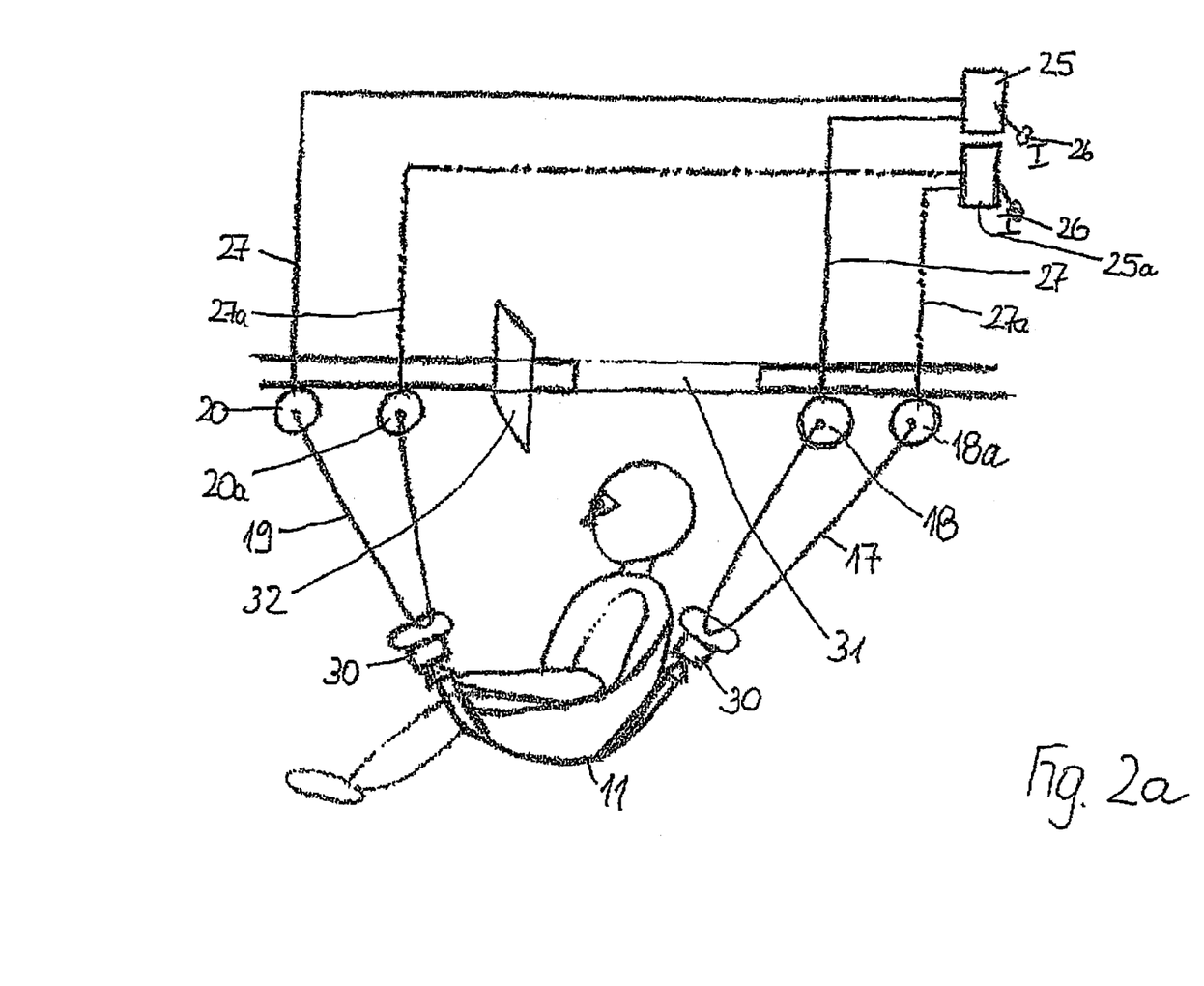
FIG. 2a shows the vehicle occupant in the lowest the position of the harness.
Figure 2B:
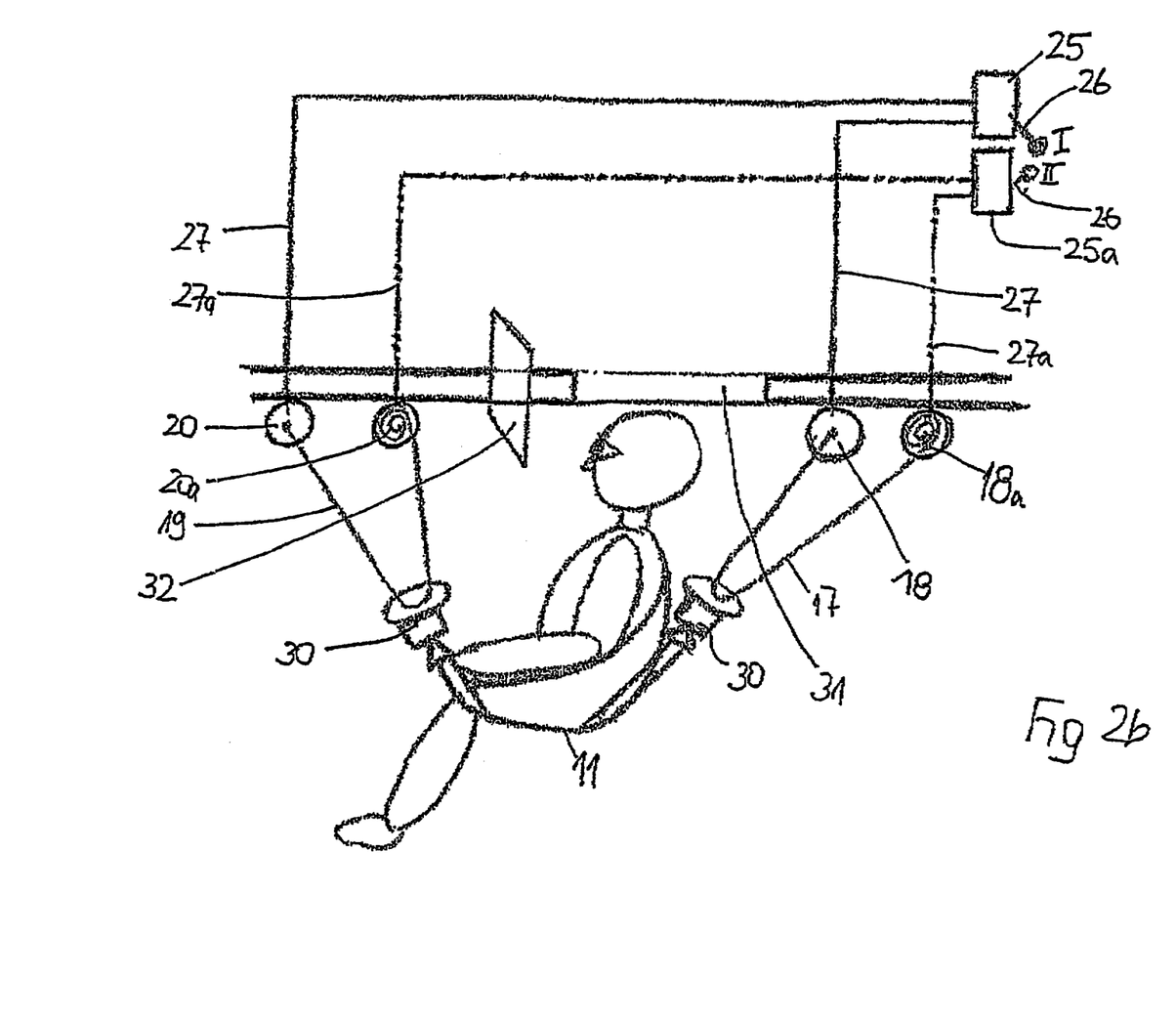
FIG. 2b shows the vehicle occupant in an intermediate operating position of the harness.
Figure 2C:
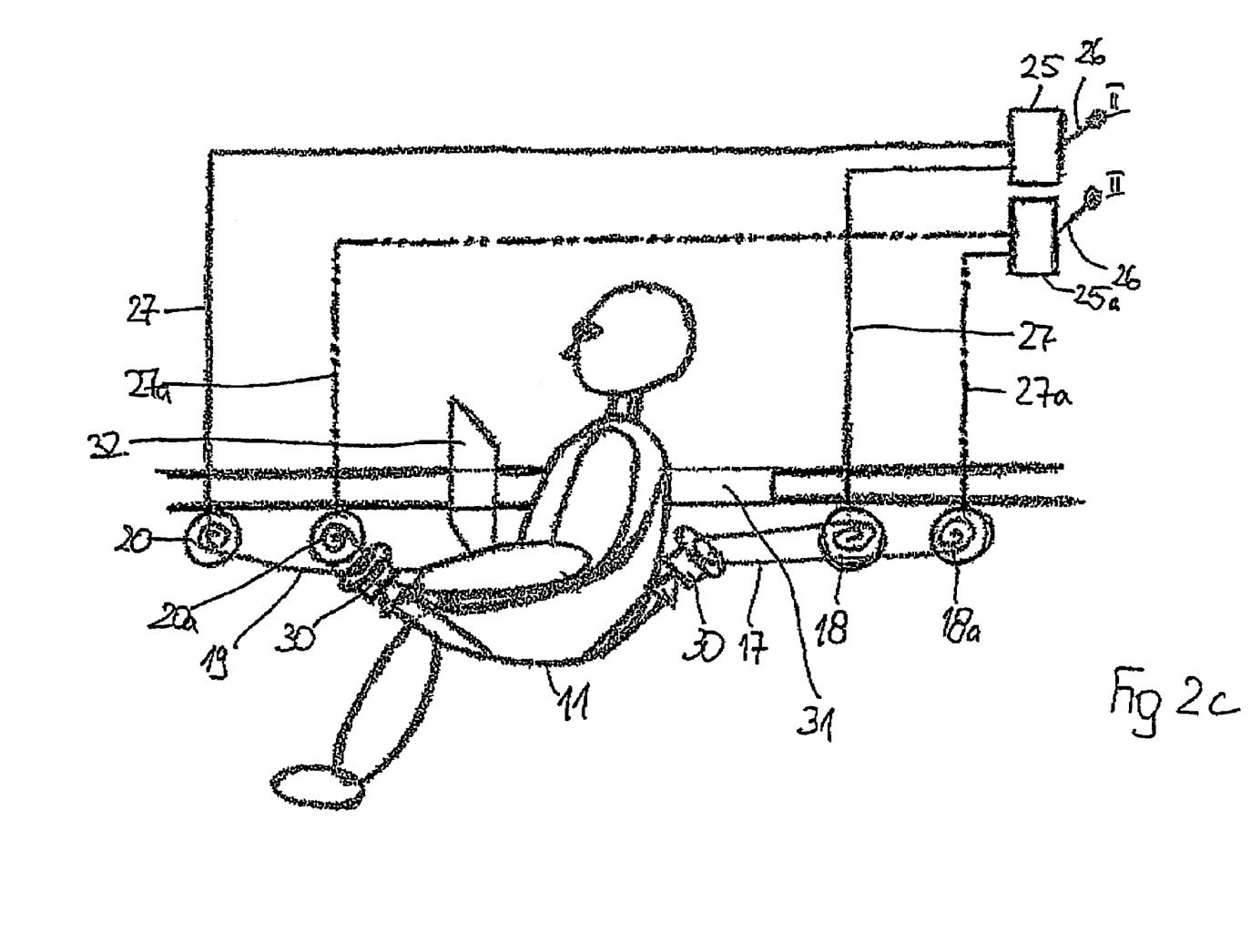
FIG. 2c shows the vehicle occupant in the uppermost position of the harness.

The embodiment represented in FIGS. 2a-2c is primarily based on the embodiment described in conjunction with FIG. 1, but differs from that of FIG. 1. One end of each supporting belt 17 and 19 is still supported on the associated belt retractor 18 or 20, respectively, as described in conjunction with FIG. 1. For the sake of simplicity, only one supporting belt 17 and only one supporting belt 19 of the entire belt arrangement is represented in FIGS. 2a-2c. Instead of a fixed connection with e.g. the belt sling 11 of the harness 10 in accordance with FIG. 1, each supporting belt 17 or 19, respectively, is releasably attached to the belt sling 11 via an associated belt buckle 30 in the embodiment shown in FIGS. 2a-2c. Each supporting belt 17 or 19 runs through the belt buckle 30 in a looped manner and extends to an additionally arranged belt retractor 18a or 20a and is, with its other end, supported on that additional belt retractor 18a or 20a. Hence, the harness that supports the vehicle occupant is now suspended from at least eight belt retractors rather than from at least four belt retractors as in the embodiment according to FIG. 1. The additional belt retractors 18a and 20a are connected to an additional switching device 25a via an additional control line 27a. The switching device 25a also has a switching lever 26, which can be moved into the positions I-II-III as described in conjunction with FIG. 1.

The embodiment represented in FIGS. 2a-2c functions as follows: After putting on the harness 10, the vehicle occupant switches both switching devices 25, 25a into the position I. In that position, the supporting belts are completely withdrawn from the belt retractors 18, 18a, 20, 20a, and the vehicle occupant suspended in the harness occupies the lowest position as shown in FIG. 2a. In that position and provided that the purpose of the vehicle is that one explained in conjunction with FIG. 1, the vehicle occupant is located under the hatch, which is provided with the reference number 31, and is therefore protected. In order to prepare the harness for use, the switching device 25 is now switched into the position II with a complete blocking of the belt retractors 18 and 20 that are linked to that switching device 25. The supporting belts 17, 19 hence remain entirely withdrawn from the belt retractors 18, 20. Now, the second switching device 25a is switched into the position III, in which a free belt retraction is enabled. In that switching position, the vehicle occupant moves into the operating position shown in FIG. 2b, in which the vehicle occupant is located under the hatch 31, but has eye contact with e.g. a reflecting square or periscope 32. In that the position, the switching device 25a is also switched into the position II resulting in a complete blocking of the connected belt retractors 18a, 20a. In order to now get to the highest position of the vehicle occupant above the hatch as shown in FIG. 2c, the switching device 25 is now switched into the position III enabling free belt retraction and the vehicle occupant moves to the highest position (FIG. 2c). Subsequently, the switching device 25 is also switched into the position II, blocking the connected belt retractors.

If the driver is now located in his highest seating position with the head or upper body protruding out of the hatch 31 of the vehicle, and if, in an unexpected dangerous situation, he has to rapidly correct or change his seating position in order to get to the intermediate operating position, in which the control of the vehicle via visual aids 32 is possible, it is solely necessary to switch the selector device 25 into the position I—free running state—so that the supporting belts 17, 19 are immediately released by the belt retractors 18 or 20, respectively.

Since the supporting belts 17, 19 are only partly withdrawn because the length of belts withdrawn from the additional belt retractors 18a and 20a is still defined by the memory function of the switching device 25a, the harness 10 is merely lowered into the position "under the hatch" (FIG. 2b). The switching device 25 can be switched to the position II—blocking state—in order to permanently maintain that operating position. In the case of another dangerous situation, both switching devices 25, 25a can be switched into the position I, in which the lowest seating position (FIG. 1a) is occupied automatically. Afterwards, though, the operating position "under the hatch" has to be newly adjusted.

As not represented in further detail, the belt retractors 18 or 20, respectively, in the embodiment described in conjunction with FIGS. 2a-2c can also be configured in such a way that the corresponding memory function is integrated into those safety belt retractors. For that reason, each of the safety belt retractors which is subsequently added to one of the supporting belts 17, 19, can be configured so as to accept both ends of supporting belts 17 or 19 respectively, which run through the harness 10 in a looped manner. Each of the two ends of a supporting belt can thereby be independently controlled in its state of movement via the switching devices 25 or 25a, respectively, that are connected independently to each belt retractor. The memory function itself, as it is described above, is thereby not changed. Only the number of necessary belt retractors is decreased.

As not represented either, the parts of the harness 10 that are located on the occupant's body can e.g. be integrated into the overalls that are to be worn by the occupant. The occupant wearing the overalls therefore connects himself to the releasable ends of the supporting belts 17 and 19 when he occupies his position in the vehicle.

The features of the subject matter of these documents, disclosed in the above description, in the patent claims and in the drawing, can separately or in any combination with each other be essential for the implementation of the invention in its various embodiments.

The specification incorporates by reference the disclosure of German priority document 103 41 483.5 filed Sep. 5, 2003 and PCT/EP2004/008885 filed Aug. 7, 2004.

The present invention is, of course, in no way restricted to the specific disclosure of the specification and drawings, but also encompasses any modifications within the scope of the appended claims.

The invention claimed is:

1. A safety seat for land vehicles, aircraft, or vessels, comprising:
   a harness (10) that is adapted to be suspended from fixed points of a vehicle and to be placed on an occupant of the vehicle, without fixed components, for supporting the occupant;
   belt retractors (18, 20, 22, 24) disposed at the fixed points of the vehicle;
   fabric supporting belts (17, 19, 21, 23) that extend from said harness (10) to said belt retractors (18, 20, 22, 24), wherein said belt retractors pretension said supporting belts in a direction of retraction; and
   a switching device (25, 26) that is adapted to be operated by the occupant for switching said belt retractors (18, 20, 22, 24) into a free running state, a blocking state, or a positioning state, wherein said free running state permits free withdrawal of said supporting belts in a direction opposite to said pretension, wherein said blocking state effects a complete blocking of said supporting belts in both said withdrawal and said retraction directions, and wherein said positioning state effects a blocking of said supporting belts in only said withdrawal direction.

2. A safety seat according to claim 1, wherein said harness (10) comprises a belt sling (11) that is adapted to support the buttocks of the occupant and is provided with two longitudinal belts (12) that are adapted to extend along the upper body of the occupant, at least one back belt (13) that is adapted to connect the longitudinal belts (12, 14) behind the occupant's body, two shoulder belts (12) that start at the longitudinal belts (12) and are adapted to extend over the occupant's shoulders, two lap belts (15) that are attached to the longitudinal belts (12), and a central belt buckle (16), wherein free ends of the shoulder belts (14) and the lap belts (15) are adapted to be buckled together in said central belt buckle (16).

3. A safety seat according to claim 2, wherein said longitudinal belts (12), in an elongation as two of said supporting belts (17), each extend to a given one of said belt retractors (18) located above said seat, and wherein two further ones of said supporting belts (19) are attached to said sling (11) in the hip area of the occupant and each extend to a given one of said belt retractors (20) disposed in front of said seat, so that said harness (10) is suspended from at least four spaced-apart belt retractors (18, 20).

4. A safety seat according to claim 1, wherein ones of said supporting belts (17, 19) are detachably connected with associated belt segments of said harness (10).

5. A safety seat according to claim 1, wherein each of said supporting belts (17,19) extends through and is supported on said harness (10) in a looped manner and extends from said harness to a further belt retractor (18*a*, 20*a*) in such a way that opposite ends of each of said supporting belts (17, 19), on opposite sides of said looped support on said harness (10), are respectively connected to one of said belt retractors (18, 18*a*, 20, 20*a*), and wherein each of said further belt retractors (18*a*, 20*a*) is connected to a further switching device (25*a*) having the functions free running state, blocking state and positioning state.

6. A safety seat according to claim 1, wherein each of said supporting belts (17, 19) extends through and is supported on said harness (10) in a looped manner, wherein ends of said supporting belts, on opposite sides of said looped support on said harness (10), are attached to associated ones of said belt retractors (18, 20), wherein switching devices (25, 25*a*) that are adapted to be operated separately and have the functions of free running state, blocking state and positioning state are associated with each of said belt retractors (18, 20), and wherein each of said switching devices (25, 25*a*) controls a state of movement of one of said ends of said supporting belts (17, 19) that are connected to said belt retractors (18, 20).

7. A safety seat according to claim 6, wherein said supporting belts (17,19) have a length such that when each belt is completely withdrawn from all of said belt retractors (18, 20), said safety seat is disposed in a lowermost position thereof.

8. A safety seat according to claim 2, wherein a given one of said supporting belts (21) that extends to a given one of said belt retractors (22) that is disposed in a floor area of said vehicle is secured to said sling (11).

9. A safety seat according to claim 2, wherein one of said supporting belts (23) that extends to a given one of said belt retractors (24) that is disposed on said vehicle in the area of the back of the occupant is connected to said at least one back belt (13) of said sling (11).

10. A safety seat according to claim 9, wherein two back belts (13, 13*a*), disposed in the area of the shoulder and hip of the occupant, are attached to said longitudinal belts (12), and wherein said one supporting belt (23) is connected to that back belt (13) that is disposed in the shoulder area.

11. A safety seat according to claim 10, wherein that back belt (13*a*) that is located in the hip area, and adjacent sections of said longitudinal belts (12), are interconnected by a fabric seating surface.

12. A safety seat according to claim 10, wherein said longitudinal belts (12) and said back belts (13, 13*a*) are interconnected by a fabric backrest.

13. A safety seat according to claim 9, wherein said supporting belts (21, 23) are detachably connected with associated belt sections of said harness (10).

14. A safety seat according to claim 12, wherein belt sections of said harness (10) are adapted to be releasably attached to ones of said supporting belts (21, 23) and are integrated into and connected to clothing adapted to be worn by the occupant.

15. A safety seat according to claim 1, wherein a switching device (25, 25*a*) having a switching lever (26) that is adapted to be moved between three positions is attached to the vehicle within reach of the occupant, and wherein control lines (27, 27*a*) lead from said switching device (25, 25*a*) to each of said belt retractors (18, 18*a*, 20, 20*a*, 22, 24).

16. A safety seat according to claim 1, wherein said pretension of said belt retractors that acts in the direction of belt retraction is induced by spring tension.

17. A safety seat according to claim 1, wherein said pretension of said belt retractors that acts in the direction of belt retraction is adapted to be produced by an active drive for belt shafts of said belt retractors.

18. A safety seat according to claim 1, wherein blocking of said belts in said belt withdrawal direction in said positioning state is adapted to be provided by a ratchet mechanism.

\* \* \* \* \*